March 20, 1962 H. D. CRANE ET AL 3,026,421

CORE DEVICE FOR PERFORMING LOGICAL FUNCTIONS

Filed June 12, 1958 2 Sheets-Sheet 1

INVENTORS.
HEWITT D. CRANE
DAVID R. BENNION

BY Christie, Parker & Hale

ATTORNEYS.

CORE DEVICE FOR PERFORMING LOGICAL FUNCTIONS

Filed June 12, 1958

2 Sheets-Sheet 2

INVENTORS.
HEWITT D. CRANE
DAVID R. BENNION
BY
Christie, Parker & Hale
ATTORNEYS.

3,026,421

CORE DEVICE FOR PERFORMING LOGICAL FUNCTIONS

Hewitt D. Crane, Palo Alto, and David R. Bennion, Loma Mar, Calif., assignors to Burroughs Corporation, Detroit, Mich., a corporation of Michigan Filed June 12, 1958, Ser. No. 741,693
7 Claims. (Cl. 307—88)

This invention relates to circuits for performing logical functions, and more particularly is concerned with a magnetic core device and associated circuitry for providing an and gate or an exclusive or gate.

In copending application Serial No. 698,633, filed November 25, 1957, now abandoned, in the name of Hewitt D. Crane and assigned to the assignee of the present invention, there is described a core register having a novel transfer circuit requiring no diodes or other impedance elements in the transfer loops between cores. The basic binary storage element of this circuit is an annular core having an input aperture and output aperture therein. Binary zero digits are stored in the form of flux oriented in the same direction in the core on either side of the respective apertures, while the binary one digits are stored in the form of flux extending in opposite directions on either side of the respective apertures. Transfer is effected by applying a current pulse of predetermined magnitude to a coupling loop linking one aperture in each of the two cores, one core constituting a transmitting core and the other core constituting a receiving core.

While a plurality of transmitting core elements can be linked to a single receiving core element in a manner to provide a circuit performing the logical and function, as taught in copending application Serial No. 710,148 and filed January 20, 1958, also in the name of Hewitt D. Crane, it is desirable from the standpoint of simplicity and economy to derive the same function from a single core element. This is accomplished in the present invention which provides the and function in a single magnetic core element. Two or more input circuits link the core element in such a way that an equivalent of binary one must be read into each of the inputs so as to unblock the output aperture. Once the output aperture is unblocked, a binary one can be read out.

In brief, the invention provides a logical and core circuit comprising a core element of magnetic material, such as ferrite, having a high flux remanence. The core element is shaped to form two sections defining relatively long closed flux paths, with a region of the core element being common to both sections. The output aperture is located in this common section while the two input apertures are respectively located in each of the two sections at points remote from the common region. Input windings link the core element through the respective input apertures, and an output winding links the core element through the output aperture in the common region of the core element. A clearing winding links both the sections of the core element for saturating flux in predetermined directions in the two relatively long closed flux paths provided by the two sections. Only when both the input windings are pulsed by a relatively large current sufficient to switch flux in the two sections is the output aperture unblocked. By pulsing the output aperture with a current below the threshold level required to switch flux around either of the two sections, flux is switched about the output aperture only when the aperture is unblocked in response to both input signals. Thus an output is derived only when both inputs have been set whereby the logical and function is accomplished.

By modifying the core device to provide a second output aperture in the common region with the output winding linking the core device through both output apertures, an exclusive or function may be accomplished. Such a device produces an output only when one or the other of the inputs exclusively are energized.

For a better understanding of the invention, reference should be had to the accompanying drawings, wherein.

Figure 7:
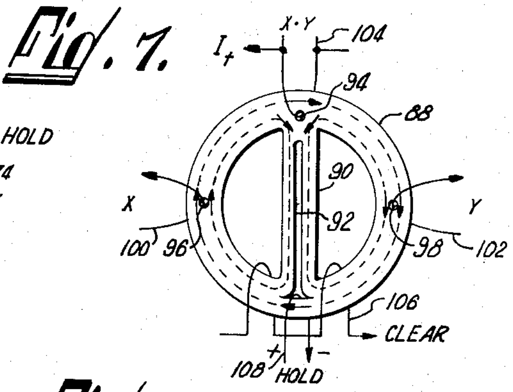
Figure 8:
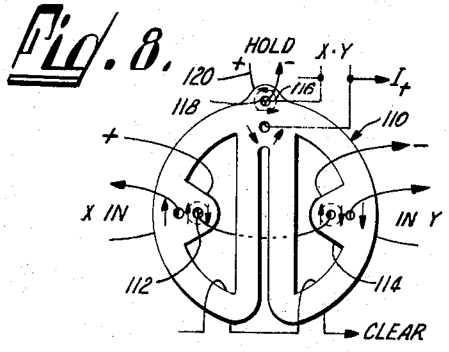
Figure 9:
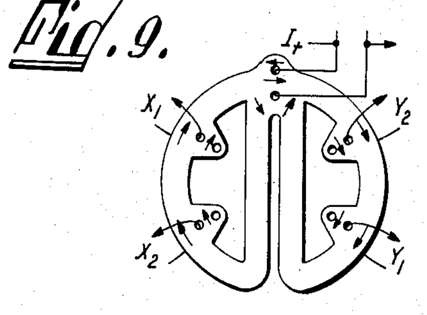
Figure 10:
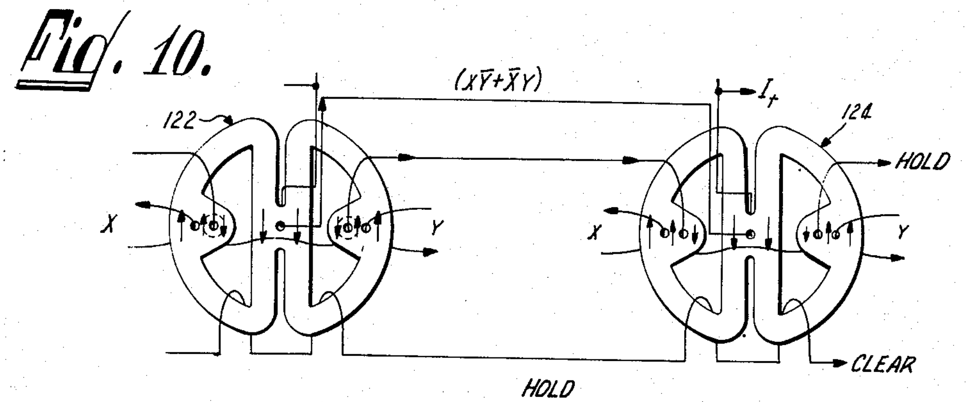
Figure 11:
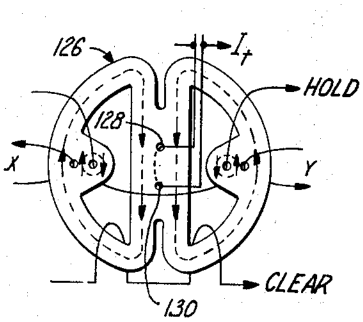
Figure 12:
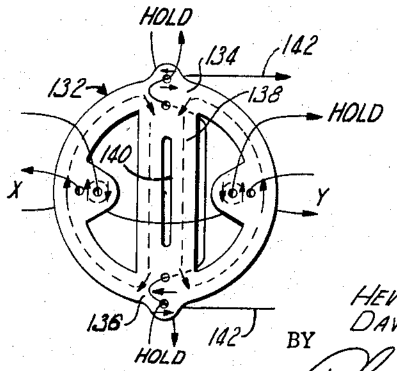

FIGS. 7, 8, and 9 show further modifications of the present invention for achieving the logical and function;

FIG. 10 shows a circuit in which two logical and devices are wired to produce an exclusive or function; and FIGS. 11 and 12 show single core devices for producing an exclusive or function.

Figure 1:
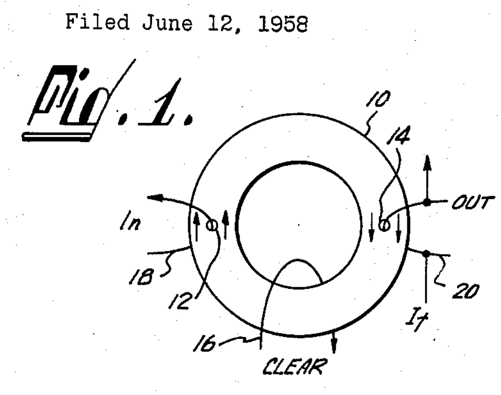
FIGS. 1 and 2 show basic multi-aperture magnetic core elements such as have been used heretofore in storing and transferring binary information without the use of diodes or other unidirectional impedance devices in the transfer circuits.
Figure 2:
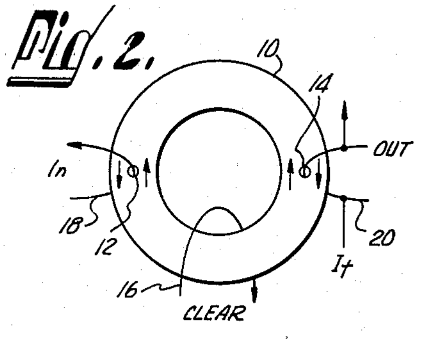

Consider an annular core, such as indicated at 10 in FIGS. 1 and 2, made of a magnetic material such as ferrite, having a square hysteresis loop, i.e., a material having a high flux retentivity or remanence. The annular core is preferably provided with two small apertures 12 and 14, each of which divides the annular core into two parallel flux paths as indicated by the arrows. If a large current is pulsed through the central opening in the core 10, as by a clearing winding 16, the flux in the core may be saturated in a clockwise direction. The core is then said to be in a cleared or binary zero condition. If a large current is passed through the aperture 12, in the direction indicated in FIG. 2, and the current is of sufficient magnitude to cause switching of flux around the central opening of the annular core, a portion of the flux can be reversed so that the flux extends in opposite directions on either side of the respective apertures 12 and 14, as indicated by the arrows in FIG. 2. The core is then said to be in the set or binary one state.

The significant aspect of the transfer circuit described in the above-identified copending application is that with a given number of turns linking one of the small apertures in the core and with the core in its cleared state as shown in FIG. 1, a current exceeding a threshold value $I_t$ must be provided to change the core to its set state as shown in FIG. 2. If the current does not exceed this threshold level, substantially no flux is switched around the core. The aperture is said to be "blocked" when the current passing through the aperture must exceed the threshold value $I_t$ in order to switch any flux in the core element.

On the other hand, if the core is already in its set state, a very small current, substantially less than the threshold value $I_t$, causes flux to switch locally about the aperture. In this case the aperture is said to be "unblocked." Thus if a current slightly less than the threshold current $I_t$ is passed through an aperture in a core element, flux will be switched or not switched within the core depending upon whether the core is in its cleared state or its set state, i.e., depending on whether the aperture is blocked or unblocked.

According to positive logic in a binary system, in the logical and function, an output Z can equal 1 only when input quantities X and Y both equal 1. For the other three combinations of X and Y, i.e., $X=0$, $Y=0$; or $X=0$, $Y=1$; or $X=1$, $Y=0$, the output Z must equal 0. For a core element then to perform the logical and function, means must be provided for singling out the condition $X=1$, $Y=1$ from the other three possible combinations.

Figure 3:
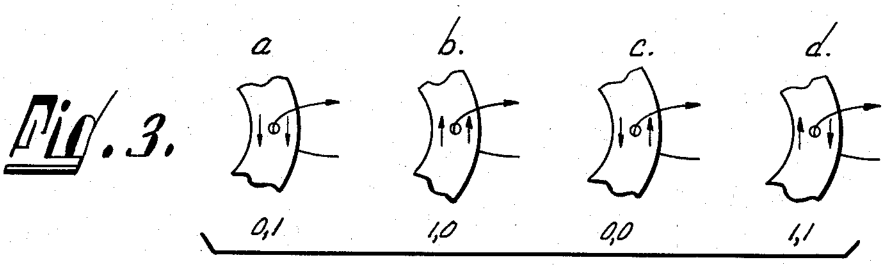
FIG. 3 shows the possible flux conditions around an output aperture in a multi-aperture core device.

Considering the output aperture 14 of FIGS. 1 and 2, it will be evident that there are four possible flux conditions for the two core legs on either side of the output aperture. These flux conditions are shown in FIG. 3. In only one of these flux conditions is the output aperture unblocked for a current linking the aperture in the direction indicated. This is the condition shown in FIG. 3*d* which corresponds to the flux condition shown in FIG. 2. It will be apparent that if the flux in the two legs on either side of the output aperture can be independently controlled according to the two inputs X and Y, if the flux on the lefthand leg in a downward direction represents a binary zero and the flux in the righthand leg in an upward direction represents a binary zero, then FIG. 3*d* represents the condition 1, 1 for the inputs X and Y.

Figure 4:
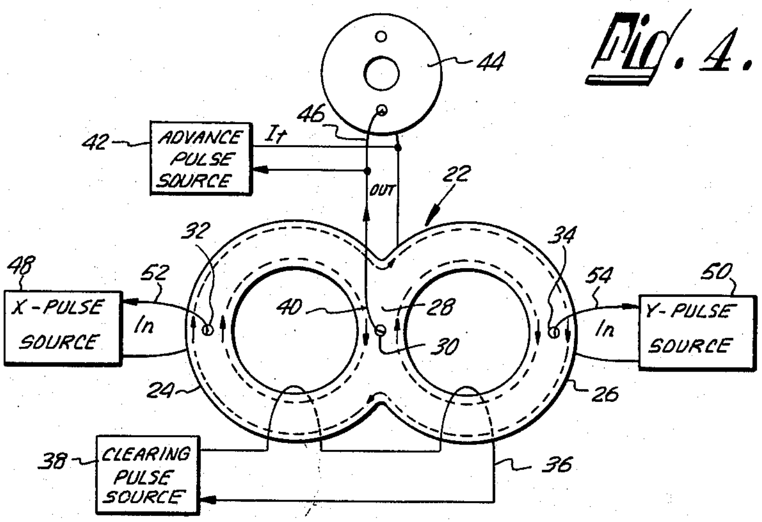
FIG. 4 shows a magnetic core device and associated circuitry according to one form of the present invention.

FIG. 4 shows one way of shaping the core element so as to independently control the flux on either side of an output aperture to utilize the principles above described in connection with FIG. 3. Thus in FIG. 4 the core element, indicated generally at 22, includes two substantially annular sections 24 and 26 as part of a figure-8 configuration, providing a common region 28 in which is located a single output aperture 30. The annular section 24 is provided with an input aperture 32 while the section 26 is provided with an input aperture 34. The core element 22 is initially cleared, so as to block the output aperture 30, by means of a clearing winding 36 which links both the annular sections 24 and 26. The clearing winding is pulsed from a suitable clearing pulse source 38 with a current sufficiently large to saturate the flux in one direction in the two sections of the core element, as indicated by the dashed lines and arrows in FIG. 4.

Information is read out of the core element 22 by means of an output winding 40 which links the core element through the output aperture 30. A readout current is pulsed through the winding 40 from a suitable constant current pulse source 42 providing a current pulse below the current threshold level $I_t$. Thus the current passed through the output winding is not sufficient to switch flux about either of the sections 24 or 26 of the core element 22.

Information may be transferred to another core element for example, such as indicated at 44, by means of a winding 46 connected in parallel with the output winding 40 across the source 42. Switching of flux in the core element 44 depends upon whether flux is switched by the advance pulse from the source 42 in the core element 22, according to the principles set forth in the above-mentioned copending application Serial No. 698,633.

The two inputs X and Y may be derived from suitable X-pulse and Y-pulse sources 48 and 50. These sources may be transmitting cores in which binary information has been previously stored. The source 48 is arranged to pulse current through an input winding 52 linking the input aperture 32, the direction of the current being as indicated by the arrow. In order to read in a binary one from the X-pulse source, a current in excess of the threshold value $I_t$ is pulsed through the input winding 52.

Similarly, the Y-pulse source 50 is arranged to pulse current through an input winding 54 linking the input aperture 34 in a direction indicated by the arrow. A current in excess of the threshold level $I_t$ is pulsed through the input winding 54 in reading in a binary one from the source 50.

In pulsing the input winding 52 to read in a binary one from the X-pulse source 48, flux is switched in the outer leg linked by the winding 52. This causes flux to switch in the lefthand leg formed by the aperture 30. Similarly, pulsing of the input winding 54 in response to a binary one from the Y-pulse source 50, by switching flux in the outer leg of the section 26 linked by the winding 54, reverses flux in the righthand leg adjacent the output aperture 30, as viewed in FIG. 4.

It will be apparent by comparing the flux configuration around the aperture 30 with the various flux conditions illustrated in FIG. 3, that only when the flux is reversed in both legs adjacent the output aperture 30 in response to pulsing of both input apertures, is the flux condition of FIG. 3*d* satisfied so as to unblock the output aperture 30. If neither one or only one of the two inputs read the binary one into the logical and circuit of FIG. 4, the aperture 30 will remain blocked and application of an advance pulse from the source 42 to the output winding 40 will not switch any flux around the output aperture 30 and consequently will not transfer any flux to the output core 44. It will therefore be appreciated that only when a binary one is read into the two inputs can binary one in effect be read out of the logical and circuit provided by the core configuration of FIG. 4.

Figure 5:
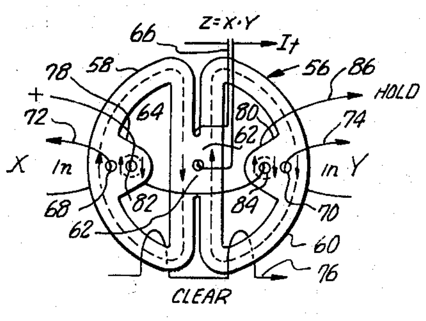
FIGS. 5 and 6 illustrate one modification of the magnetic core element which can be used for performing the logical and function.
Figure 6:
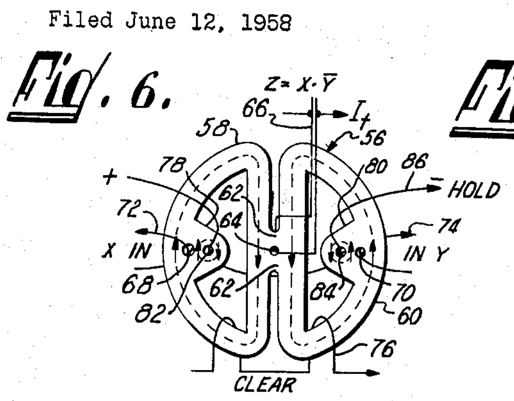

A more compact and flexible core arrangement for accomplishing the logical and function is shown in FIGS. 5 and 6. The core element, as indicated generally at 56, includes at least two sections 58 and 60 providing substantially independent closed flux paths. The two sections have a common region 62 in which is located an output aperture 64, the output aperture being linked by an output winding 66 to which is applied a readout current $I_t$ as indicated.

Each of the sections 58 and 60 is provided with an input aperture, as indicated at 68 and 70 respectively. Input windings 72 and 74 link the input apertures 68 and 70 respectively. A clearing winding 76 links both the sections 58 and 60 of the core element. The core element 56 differs from that of the core element 22 in FIG. 4 by utilizing the principles of application Serial No. 741,691, filed June 12, 1958 in the name of Hewitt D. Crane, now Patent 2,935,622 issued May 3, 1960 and assigned to the assignee of the present invention, for satisfying the flux conditions around the input apertures 68 and 70. Thus enlarged regions are provided at the input apertures, as indicated at 78 and 80, in which are provided apertures 82 and 84 respectively. A hold winding 86 links the core element through these additional apertures. The hold winding has a D.C. signal applied thereto for setting flux up in a local closed path around the apertures 82 and 84 respectively to establish the proper flux conditions around the input apertures 68 and 70. With the hold winding arranged as indicated in FIG. 5 and a current passed therethrough in the direction shown, it will be seen that the flux adjacent the input apertures, as shown by the arrows, is identical to the flux condition at the input apertures 32 and 34 of FIG. 4.

With the core element 56 cleared to the flux pattern as shown in FIG. 5, the output aperture 64 is blocked in response to a current passed through the output winding 66 in the direction indicated, that is, a current applied to the output winding cannot switch flux locally about the output aperture 64. However, pulsing of current through both the input apertures 68 and 70 results in reversing of flux in the two legs on either side of the output aperture 64. In this case the aperture 64 is unblocked and flux may be switched in response to the output advance current $I_t$.

It will be appreciated that in both the circuits of FIG. 4 and FIG. 5, merely by reversing the direction of the current $I_t$ for reading out from the output aperture, an output signal corresponding to a binary one, can be read out only when the flux conditions corresponding to the binary zero condition are set up at the input apertures. In other words, with the core elements cleared to the flux condition indicated in the drawing, the output apertures 30 and 64 respectively are unblocked for current passed through the output winding in the opposite direction from that indicated, since a reverse current in the output winding will produce local switching of flux about the output apertures. Thus an output is derived only when no input is applied to either input winding. This may be expressed in Boolian algebra form as the function $Z=\overline{X}\cdot\overline{Y}$.

FIG. 6 is identical to FIG 5 except that the hold winding on the aperture 84 is reversed and the portion of the clear winding 76 linking the righthand section 60 of the core element is reversed. As a result the flux condition in the cleared state is as shown in FIG. 6, with the flux extending downwardly in the legs on either side of the output aperture 64. This means that a binary one can be produced at the output in response to the advance current $I_t$ only after the X input has been pulsed and under no other circumstances. This corresponds to the function $Z=X\cdot\overline{Y}$.

Merely by reversing the direction of the advance current applied to the output winding, the circuit of FIG. 6 can be arranged to produce an output only after the Y input has been pulsed. This corresponds to the function $Z=\overline{X}\cdot Y$. It will therefore be appreciated that the core device of FIGS. 5 and 6 can be made to generate the and function for four different conditions of input, depending upon the arrangement of the associated windings.

In theory there need be only three legs adjacent an output aperture, namely, one leg for each of the inputs and one leg for the output. An arrangement is shown in FIG. 7 in which a minimum number of legs are in effect provided around the output aperture. In this arrangement, a core 88, generally annular in shape, includes a central branch 90 extending diametrically across the center of the main annular core portion. The central leg 90 is split into two legs by an elongated slot 92. The output aperture is positioned in the annular portion of the core adjacent one end of the central branch 90. Input and output apertures 96 and 98 are positioned in the annular portions of the core element 88 on either side of the central branch portion 90.

The elongated slot 92 at the end opposite from the output aperture 94 extends into the annular portion of the core a distance equal to substantially half the radial width of the annular portion and is rounded as indicated to eliminate unsaturated regions due to the curvature of the flux at the junction between the central branch 90 and the inside of the annular portion of the core element 88.

As in the and circuit described above, input windings link the input apertures 96 and 98, as indicated at 100 and 102 respectively, and an output winding 104 links the output aperture 94. The current at the threshold level $I_t$ is applied through the output winding to read out information.

A clearing winding 106 links the annular portion of the core element on either side of the central portion 90 and when pulsed, clears the flux in the core in the manner indicated by the dash lines and arrows in FIG. 7. A hold winding 108 to which direct current is applied, holds the flux from switching in the outer leg formed in the annular portion of the core by the lower end of the elongated slot 92.

The output winding 104 normally forms a low impedance circuit linking the output aperture 94. The effect is to hold flux from switching in the outer leg formed by the aperture 94 and linked by the output winding 104. Thus when respective input windings are pulsed to switch flux in the outer legs formed by the apertures 96 and 98 respectively, the result is to switch the direction of flux in the two legs formed in the core at the junction between the annular portion and the upper end of the central portion 90. With the flux switched in both of these legs, all the flux around the aperture 94 extends entirely in a clockwise direction so that the aperture is unblocked. Thus only when a binary one is read into the two inputs can a binary one be read out of the output of the core device shown in FIG. 7.

The core device of FIG. 8 is similar to that of FIG. 7 in that three flux legs are provided around the output aperture. However, instead of providing flux closure around the outer periphery of the core as in FIG. 7, the proper flux condition at the respective apertures is provided locally by enlarged regions with extra apertures for defining a local flux path established by holding windings. Thus the core device, indicated generally at 110, includes enlarged regions 112 and 114 respectively, each of which include input apertures and hold apertures in the same manner as the core device described in connection with FIGS. 5 and 6. The output aperture which is located in the same manner as in the core device of FIG. 7, is located in an enlarged region of the core as indicated at 116 in which is located a hold aperture 118. The enlarged region with the aperture 118 provides flux closure for establishing the proper flux condition in the region of the output aperture. A hold winding 120 to which a direct current is applied, passes through the hold aperture 118. Operation of the core device of FIG. 8 is otherwise substantially the same as in FIG. 7.

It is possible to obtain further functions by means of the core device, as described in connection with FIG. 8, by adding additional enlarged regions as indicated in the arrangement of FIG. 9. Thus additional input windings may be provided. Either one of the two inputs on each of the two sections of the core may be utilized to control the flux in one of the legs adjacent the output aperture. Thus in the arrangement of FIG. 9, an output is produced if an input is applied at $X_1$ or $X_2$ and at $Y_1$ or $Y_2$. It will be also apparent that the extra enlarged regions with their associated apertures can be used for outputs if desired. Thus a large number of different functions can be performed using the same basic core element.

While the invention has been particularly described as providing an and function in response to two inputs X and Y, the invention in principle is applicable to producing an and function in connection with more than two inputs. All that is required is that additional flux legs adjacent the output aperture be established which can be independently controlled by the additional inputs. However, it will be recognized that there are geometric limitations in trying to provide for a substantial number of additional inputs in this manner.

The principles of the invention as thus far described may also be used to produce an exclusive or function in which inequality between two inputs is sensed. Expressed in Boolian algebra form, the exclusive or function provides that $Z=X\overline{Y}+\overline{X}Y$. As shown in FIG. 10, the exclusive or function can be derived by means of two and circuits, such as described above in connection with FIG. 6, with the windings linking the output apertures connected in series, in the manner described in copending application Serial No. 710,149, filed January 20, 1958 in the name of Hewitt D. Crane. The lefthand core device, indicated generally at 122 in FIG. 10, is identical to the core circuit described above in connection with FIG. 6. Thus a binary one is sensed by the output winding when a binary one has been read into the X input but not into the Y input. The righthand core device, indicated generally at 124, has the output winding reversed in relation to the direction of current passing therethrough, so that a binary one is sensed by the output winding when a binary one has been read into the Y input but not into the X input. By connecting the two output windings in series across the source of advance current $I_t$, if either one of the output apertures in the core devices 122 and 124, respectively, is unblocked, a binary one is sensed at the output across the output windings.

It should be noted in this circuit as well as in all the circuits described above, that the output is sensed as the increase in impedance in the output winding due to the switching of flux in the core element linked by the output winding. In the circuit of FIG. 10, if either output aperture is unblocked, flux linked by one of the two output windings in series is switched, causing an effective increase in impedance of the series output windings which may be sensed.

It will be apparent that the exclusive or circuit of FIG. 10 can be modified by providing both output apertures in a single core element instead of two core elements as shown. A single core element circuit for achieving the exclusive or function is shown in FIG. 11. The core device of FIG. 11, indicated generally at 126, is substantially the same as that described above in connection with FIG. 6 with the exception that two output apertures 128 and 130 are provided in the common core region. In the cleared state of flux, as indicated by the dash lines and arrows of FIG. 11 the flux extends in the same direction on both sides of both output apertures. If flux is switched in response to a current pulse in the X input, flux will extend in the opposite directions on either side of the two apertures. However, for an output current applied to the output winding in the direction indicated, only the output aperture 130 is unblocked, i.e., the output current $I_t$ can reverse flux locally only about the aperture 130. On the other hand if an input current pulse is applied only to the Y input, the aperture 128 becomes unblocked. If neither X nor Y is pulsed or if both X and Y inputs are pulsed, both apertures remain blocked and no flux is switched in response to an output current pulse applied to the output winding. Thus the circuit of FIG. 11 accomplishes the exclusive or function.

By reversing the direction that the clear winding links the righthand portion of the core element and by reversing the direction in which the hold winding links the hold aperture in the righthand portion of the core element of FIG. 11, the circuit may be modified to accomplish the function $Z=XY+\overline{XY}$.

The and circuit of FIG. 8 may be modified to provide an exclusive or device in the manner shown in FIG. 12. In this case the core device, indicated generally at 132, includes two common regions 134 and 136 in the two relatively long flux paths indicated by the dash lines. The two common regions are each identical to the single common region of the core element of FIG. 8, but are located at opposite ends of the central portion of the core indicated at 138. The central portion 138 is divided into two parallel legs by an elongated slot 140. An output winding 142 links pairs of apertures in both the common regions. If either the X input or the Y input is pulsed so as to reverse flux in one of the indicated closed flux paths, the output winding will link an unblocked aperture and therefore a binary one can be read out in response to a current pulse applied to the output winding 142.

What is claimed is:

1. A magnetic core logic circuit comprising a core element of magnetic material having a rectangular hysteresis characteristic, the core element having two sections defining two long closed flux paths around two relatively large openings, said sections being of substantially uniform cross-sectional area over a substantial part of the closed loop flux paths, the two sections of the core being joined in a region common to both flux paths, the region having at least one relatively small aperture defining a short closed flux path, the two sections each having at least one small aperture at a point remote from the common region, first and second windings connected in series for connection to a common pulse source, each of the windings passing through a respective one of the large openings and linking the associated long flux path around the large opening, a third winding passing through the remote small apertures in one section of the core and linking at least a portion of the long flux path in the associated section, a fourth winding passing through the remote small aperture in the other section of the core and linking the long flux path in the associated section, and a fifth winding passing through the small aperture in the common region and linking said short flux path in the common region.

2. Apparatus as defined in claim 1 further including means for initially pulsing a large unidirectional current through the series connected first and second windings to orient the flux in the two relatively long closed flux paths, means for pulsing a current through the third winding in excess of a threshold current level required to switch flux around the associated relatively long flux path in response to a first input signal, means for pulsing a current through the fourth winding in excess of a threshold current level required to switch flux around the associated relatively long flux path in response to a second input signal, and means for pulsing a current through the fifth winding below the threshold current level required to switch flux around either of the relatively long flux paths but in excess of the threshold current level required to switch flux around the relatively short flux path in the common region.

3. Apparatus as defined in claim 1 wherein the core element has an annular portion with a central leg extending diametrically across the central opening of the annular portion, the small aperture being positioned in the annular portion at one junction with the central leg, the central leg having an elongated slot extending from a point adjacent the small aperture to a point in the annular portion diametrically opposite the small aperture for dividing the central leg into two parts, whereby the two parts of the central leg form with the associated halves of the annular portion of the core the respective two relatively long closed flux paths, and a holding winding linking the annular portion of the core through the elongated slot in the central leg at the end thereof opposite from the output aperture.

4. Apparatus as defined in claim 1 wherein the core element is enlarged in the region of small remote apertures, the enlarged regions each having an additional aperture therein, and holding windings linking the core element through the additional apertures in the enlarged region of the core element.

5. Apparatus as defined in claim 1 wherein the common region has an additional aperture for forming an additional relatively short closed flux path in the common region, the core between the two apertures in the common region being common to the two relatively short flux paths in the common region, a holding winding linking the core element through the additional aperture in the common region, and the fifth winding linking the core element through both apertures in the common region of the core element.

6. A core element of magnetic material having high flux remanence, the core element being shaped to form two sections, each section having a large central opening and defining a relatively long closed flux path around the central opening, with a region of the core being common to both sections, the common region of the core having at least one small aperture therethrough separating the two relatively long closed flux paths in the common region and defining a relatively short closed flux path around the small aperture in the common region, and the two sections each having an enlarged region with two small apertures positioned therein at a point remote from the common region.

7. Apparatus as defined in claim 6 wherein the common region has an additional aperture for forming an additional relatively short closed flux path in the common region, the core between the two apertures in the common region being common to the two relatively short flux paths in the common region.

References Cited in the file of this patent

UNITED STATES PATENTS 2,919,430 Rajchman ............ Dec. 29, 1959